United States Patent
Römer

(10) Patent No.: US 6,666,439 B2
(45) Date of Patent: Dec. 23, 2003

(54) SPRING STRUT SUPPORTING BEARING

(75) Inventor: Matthias Römer, Altdorf (DE)

(73) Assignee: DaimlerChrysler AG, Stuttgart (DE)

( * ) Notice: Subject to any disclaimer, the term of this patent is extended or adjusted under 35 U.S.C. 154(b) by 5 days.

(21) Appl. No.: 10/360,427

(22) Filed: Feb. 7, 2003

(65) Prior Publication Data

US 2003/0151181 A1 Aug. 14, 2003

(30) Foreign Application Priority Data

Feb. 8, 2002 (DE) .......................................... 102 05 264

(51) Int. Cl.$^7$ ............................................... B60G 15/00
(52) U.S. Cl. ................... 267/220; 280/124.155
(58) Field of Search ...................... 267/33, 153, 219, 267/220; 280/124.147, 124.155

(56) References Cited

U.S. PATENT DOCUMENTS

| | | | |
|---|---|---|---|
| 4,477,061 A | * 10/1984 | Kawaura et al. | ....... 188/321.11 |
| 4,673,192 A | * 6/1987 | Krehan et al. | ........ 280/124.155 |
| 4,756,516 A | * 7/1988 | Tondato | ....................... 267/153 |
| 5,342,029 A | * 8/1994 | Carter | ........................ 267/220 |
| 5,678,808 A | * 10/1997 | Claude et al. | ......... 188/321.11 |

FOREIGN PATENT DOCUMENTS

DE          199 35 391          2/2001

* cited by examiner

*Primary Examiner*—Christopher P. Schwartz
(74) *Attorney, Agent, or Firm*—Klaus J. Bach

(57) ABSTRACT

In a motor-vehicle spring-strut support bearing for mounting a piston rod of the spring strut to a vehicle support element, the piston is mounted in the support element to a connecting element which is connected to the support element by an annular resilient spring element disposed between the connecting element and the support element and axial stops are provided including a spherically curved surface on the support element, which limit axial movement of the piston rod upon compression of the spring strut by a vehicle wheel in one direction and upon rebound of the wheel in the opposite direction, the arrangement providing a force-centering support of the spring strut piston rod on the spring strut support.

7 Claims, 3 Drawing Sheets

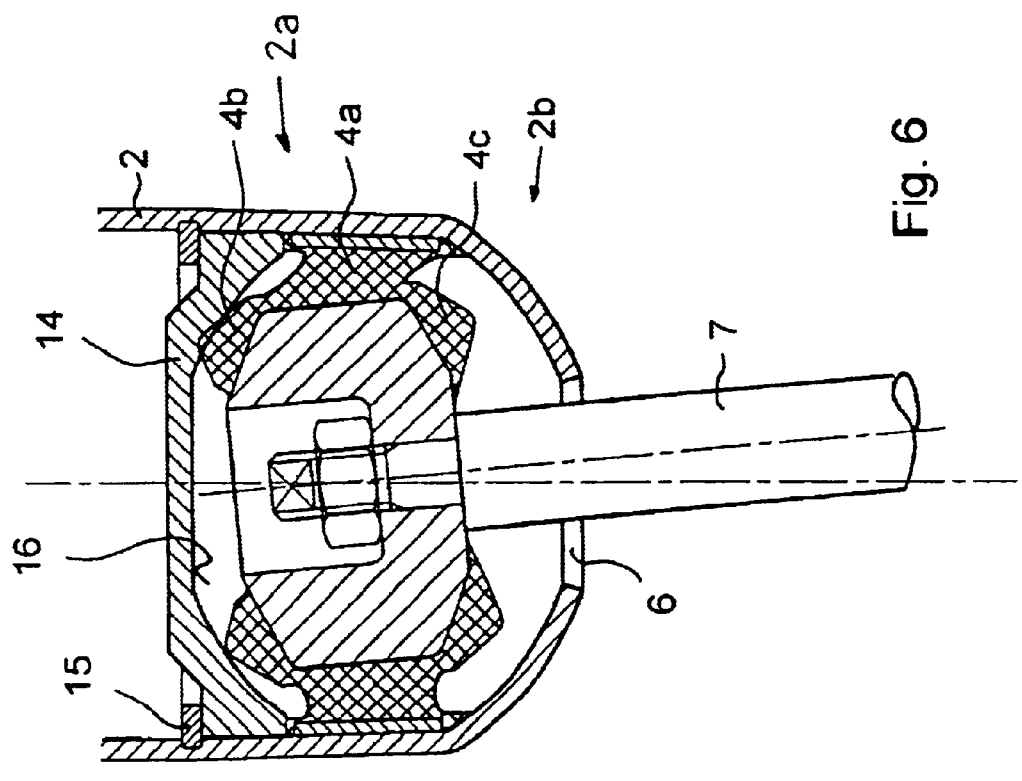
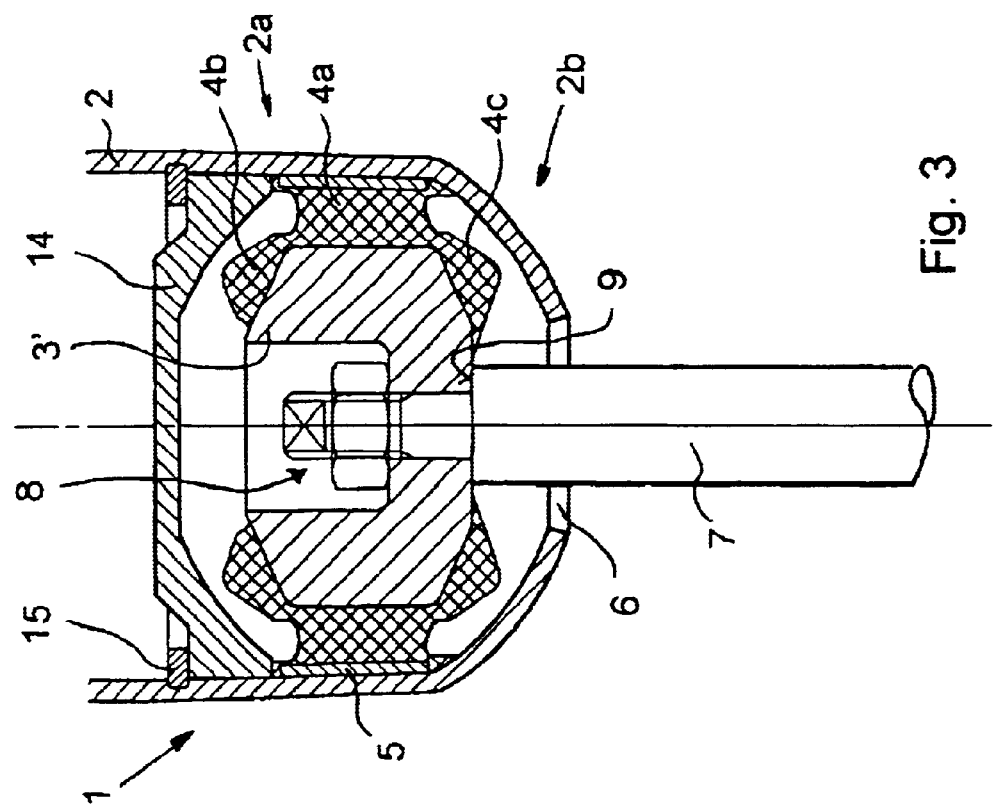

SPRING STRUT SUPPORTING BEARING

The invention relates to a spring-strut support bearing for supporting a motor vehicle spring strut on the body of the motor vehicle.

BACKGROUND OF THE INVENTION

DE 199 35 391 A1 discloses a spring-strut support bearing, including an inner ring which has at each of its two end faces at least one elastically compliant stop buffer for limiting extreme deflecting movements in the direction of movement of the shock absorber. The stops can be provided by surface areas of the base of a flange fastened to the vehicle body or respectively, the vehicle body itself.

If a wheel, which is supported on the vehicle body via the spring strut, is moved toward the vehicle body at the moment when the spring strut undergoes a relatively large cardanic deflection from its design position, the piston rod of the shock absorber is subjected to a severe bending stress, so that it can be distorted or can even break.

The object of the invention, therefore, is to provide a spring-strut supporting bearing of the known type, with which however even with a cardanic deflection of the spring strut from the design position, compression and rebound of the guided vehicle wheel is permanently and reliably ensured.

SUMMARY OF THE INVENTION

In a motor-vehicle spring-strut support bearing for mounting a piston rod of the spring strut to a vehicle support element, the piston is mounted in the support element to a connecting element which is connected to the support element by an annular resilient spring element disposed between the connecting element and the support element and axial stops are provided including a spherically curved surface on the support element, which limit axial movement of the piston rod upon compression of the spring strut by a vehicle wheel in one direction and upon rebound of the wheel in the opposite direction, the arrangement providing a force-centering support of the spring strut piston rod on the spring strut support.

The piston rod of the shock absorber of the strut is mounted so as to be pivotable about a point located on the longitudinal axis of the piston rod. This pivot point is at the same time the central point about which the support element is spherically curved. In simplified form, the curved part of the support element may have a radius larger than its distance from the pivot point or it may even be conical. During compression or rebound of a spring strut during which the spring strut is cardanically deflected relative to the design position, a point-like engagement of a support surface, which is connected to the piston rod, with the stop can thereby be avoided. Rather, an annular supporting surface is established which centers the force transmitted by the piston rod and therefore equalizes the moments transmitted to the support element.

Since the base of the cup-like support element is not planar, but is curved or conically shaped, the rigidity of the support element is increased. This makes it possible to reduce the wall thickness of the support element and thereby saves weight.

The spring-strut bearing can have a plurality of spring or resilient elements, which, separately from one another, absorb radial or axial forces. This separation in for example first and second resilient elements is advantageous in that different elastomers having different spring and damping characteristics can be used depending on the individual tasks of the parts. However, according to the invention the spring-strut bearing can also be provided with a single-piece resilient element, which is vulcanized onto the connecting element and absorbs and transmits the radial bearing forces and the axial stop forces.

In a particular embodiment of the invention, the second spring element of the spring-strut support bearing comprises two engagement discs which, spaced apart from each other by a spacer sleeve, are clamped between the connecting element and a piston-rod shoulder. The multi-part configuration of the engagement discs ensures that the engagement discs, which are arranged one within and the other outside the support element, can be mounted. A single-piece embodiment of the connecting element, which embodiment comprises the first support disc and the spacer sleeve, is also conceivable.

In a particular refinement, the engagement discs are designed in such a manner that their sides which face the spherically curved support-element section have surface areas which are likewise spherically curved or have a conical profile. In this case, the surfaces in the design position of the spring strut, are arranged at an approximately constant distance from the surface of the support element. As a result, the elastomeric material, which, for example, is vulcanized onto the surfaces of the support discs, is less strongly deformed during contact with the supporting element, which has a life-increasing effect.

The selection of spring or resilient elements having different spring or damping characteristics enables the spring-strut support bearing to be designed so as to be capable to accommodate the stress. Thus, as a rule, softer elastomers are used for the axial stops in the bearing than for the radial support. The shaping of the resilient elements also has an effect on the damping and noise behavior of the bearing. In one refinement according to the invention therefore the damping element is bead-shaped.

Exemplary embodiments of the invention will be described in greater detail below with reference to the accompanying drawings:

BRIEF DESCRIPTION OF THE DRAWINGS

FIG. 3 shows a bearing variant in which a resilient element is disposed fully within a stop structure, FIG. 6 is an illustration according to FIG. 3 with the piston rod cardanically deflected during a compression process.

DESCRIPTION OF PREFERRED EMBODIMENTS

Figure 1:
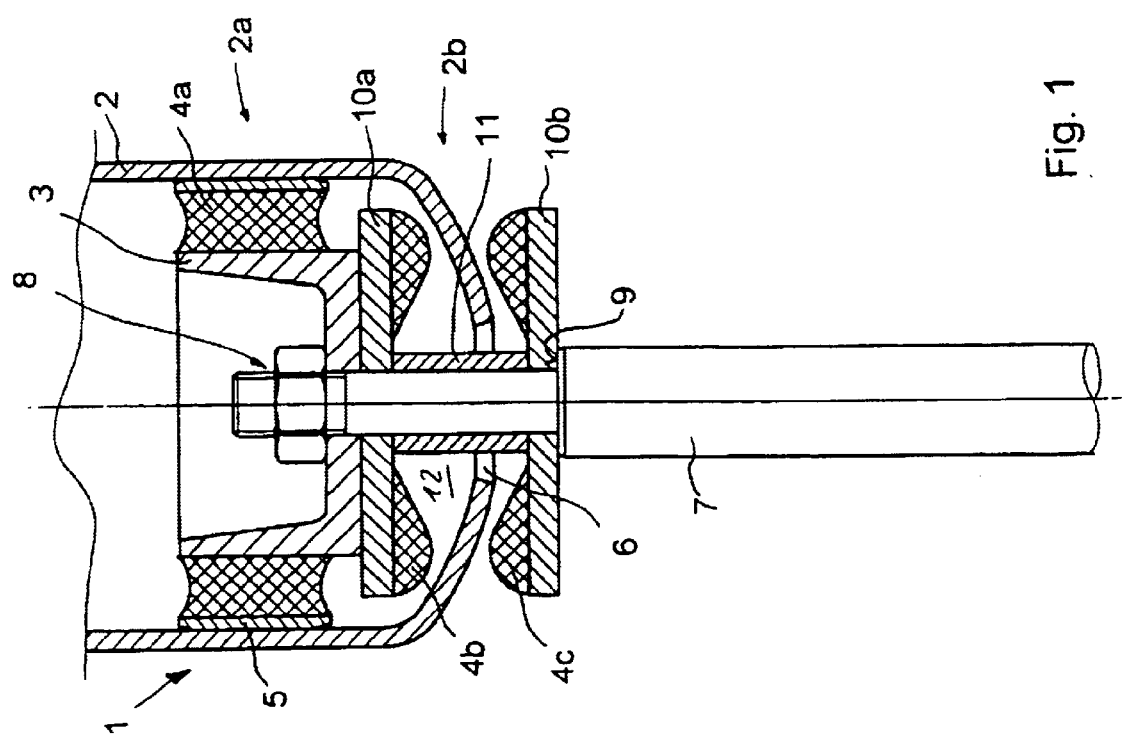
FIG. 1 shows schematically a spring-strut support bearing having a resilient support structure with flat engagement discs and a spherically curved stop structure.

FIG. 1 shows an embodiment of the spring strut support bearing according to the invention. The bearing includes a support element 2, which is connected to, or part of, a vehicle body, and a connecting element 3 and further a resilient spring element 4a, which is arranged between the support element 2 and the connecting element 3, firmly connected to the inner wall of the tubular section 2a of the support element 2 by means of a sleeve 5.

A piston rod 7 extends through an opening 6 in the curved section 2b of the support element 2 and is connected at its upper end to the connecting element 3 by a screw connection 8. Two circular support discs 10a, 10b, which are arranged concentrically with respect to the longitudinal axis 7a of the piston rod 7, are clamped between the connecting element 3 and a piston-rod shoulder 9 via a spacer sleeve 11 in such a manner that the upper support disc 10a is arranged in a space 12 bounded by the support element 2, the connecting element 3 and the resilient spring element 4a. In contrast, the lower support disc 10b is arranged outside the space 12 between the curved section 2b of the support element 2 and the piston-rod shoulder 9. A second and a third resilient element 4b, 4c are vulcanized concentrically onto the facing sides of the support discs 10a, 10b, opposite the support element 2 so as to form annular beads for engagement with the support element 2.

Figure 2:
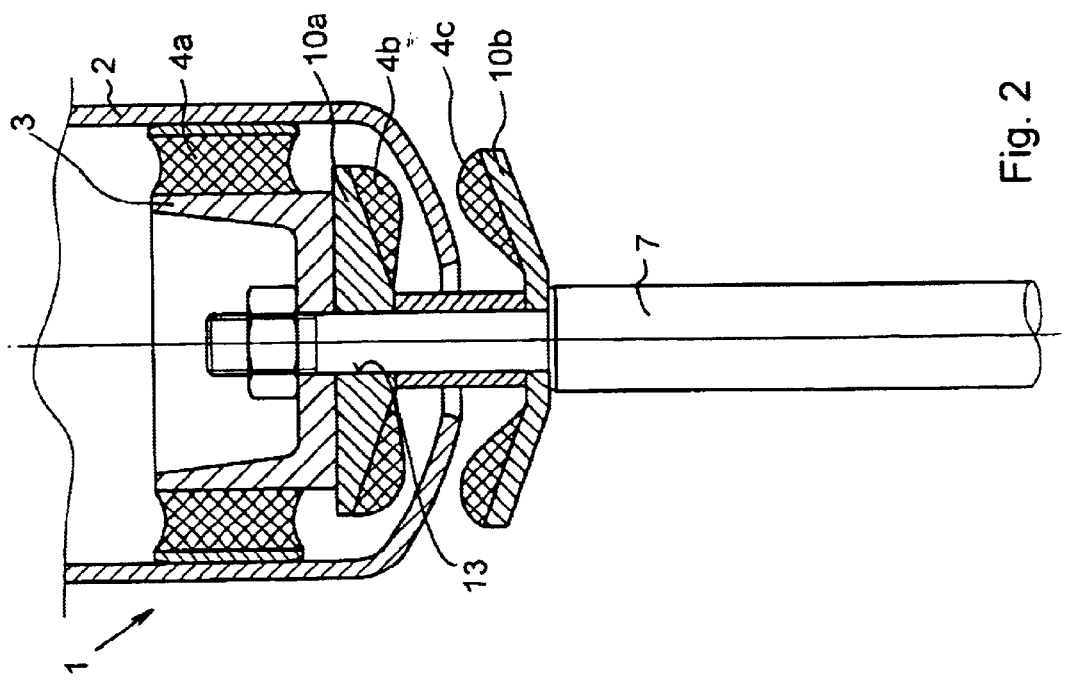
FIG. 2 shows as support bearing according to FIG. 1, but with conical engagement discs.

In a modification, the support discs 10a, 10b are of partially conical design as shown in FIG. 2. The upper support disc 10a has, on the side facing the connecting element 3, a planar surface for bearing against the connecting element 3. In contrast, the side of the upper support disc 10a which lies opposite the connecting element 3 has a shape which rises linearly from the circumference towards the center, with the result that the support disc 10a has a maximum thickness directly around its central bore 13. In contrast, the lower support disc 10b has a constant thickness and is bent in the direction of the support element 2, so that there is an essentially constant distance between the surface of the support disc and the surface of the supporting element in the longitudinal direction.

A further embodiment of the invention is illustrated in FIG. 3. The spring or rather resilient element 4a, 4b, 4c is embodied as a single piece and has a cohesive material joint. In comparison with the embodiments in FIG. 1 and FIG. 2, the support discs 10a, 10b are omitted and the connecting element 3' is mounted onto the piston rod 7 and clamped directly on the piston-rod shoulder 9 via a screw connection 8.

The connecting element 3' together with the lower part 4c of the spring element 4a, 4b, 4c and the spherically curved section 2b of the support element 2 form the tension stop during rebound of the vehicle wheel (downward movement) held by the spring strut.

The opposite compressive stop is formed by the connecting element 3' together with the upper part 4b of the spring element 4a, 4b, 4c and a curved cover 14, which is held in the axial direction by means of a securing ring 15 and engages the upper edge of the first spring element 4a and the sleeve 5 to hold it in position on the inner wall of the support element 2.

Figure 4:
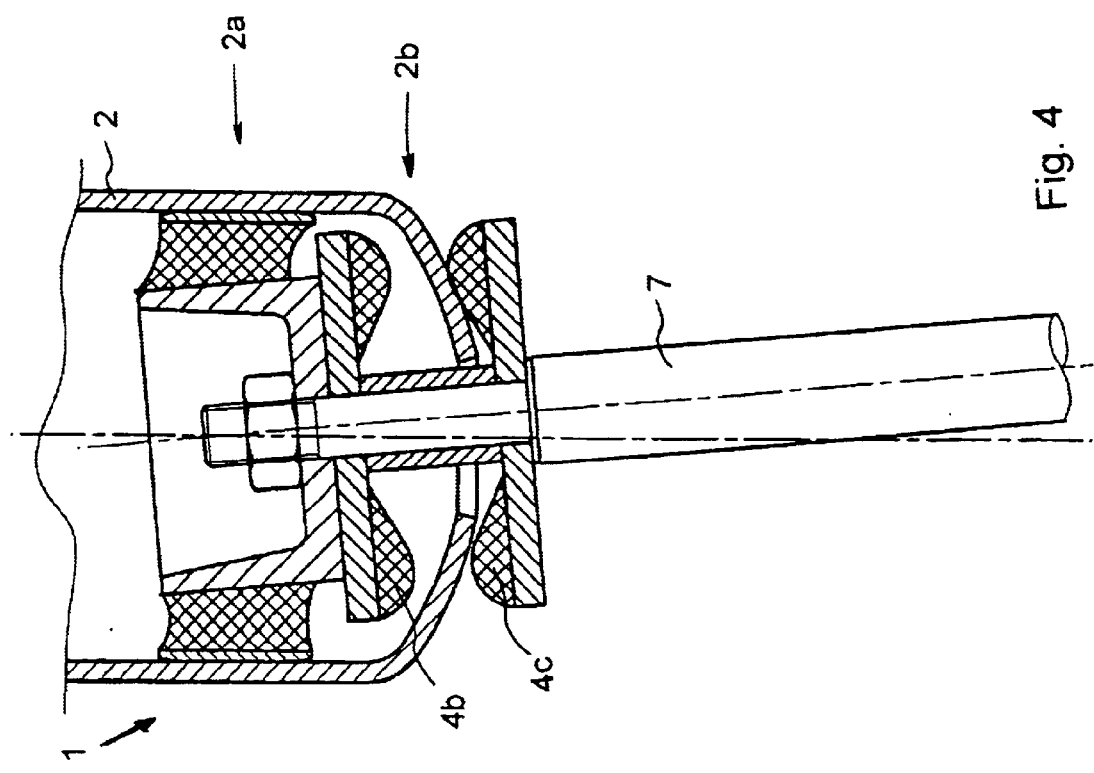
FIG. 4 is an illustration according to FIG. 1 with the piston rod deflected cardanically during a compression process (upward movement of a wheel)
Figure 5:
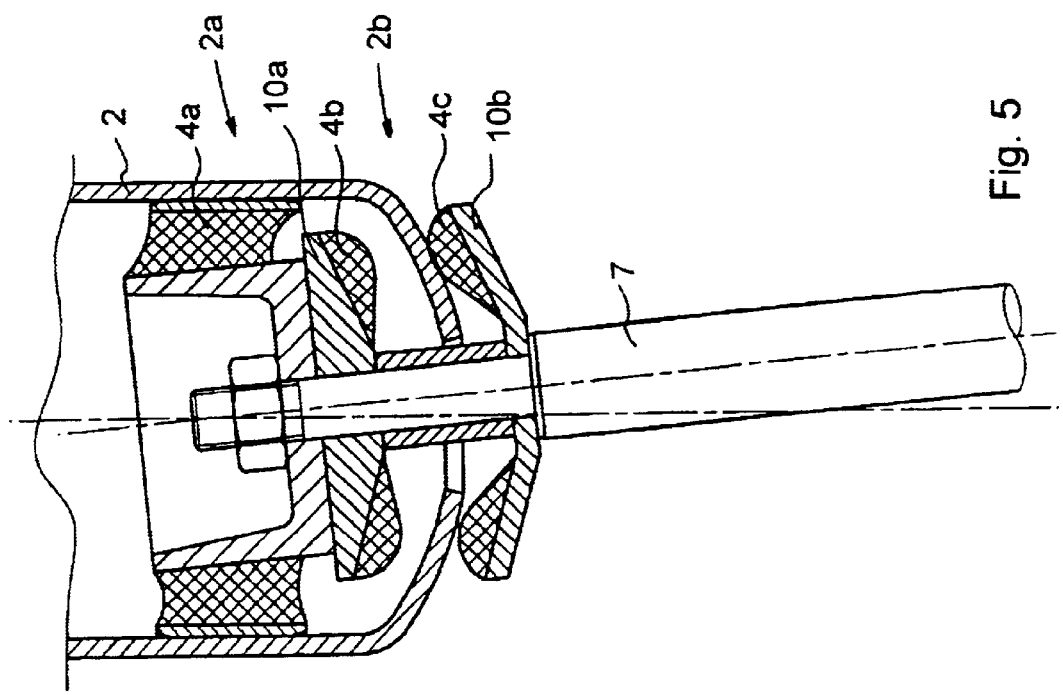
FIG. 5 is an illustration according to FIG. 2 with a piston rod cardanically deflected during a compression process.

FIG. 4, FIG. 5 and FIG. 6 are sectional views of the bearing according to the invention with the piston rod cardanically deflected in each case. FIG. 4 and FIG. 5 reveal the manner in which the lower resilient element 4c bears with an annular contact surface against the curved surface of the support element 2 when forced upwardly by the piston rod 7. The force transmitted by the piston rod 7 is therefore supported on the support element 2 in a manner virtually free of any moment effective on the piston, rod 7. This effectively eliminates the risk of bending the piston rod and prevents fracturing.

In FIG. 6, the first part 4a of the resilient element 4a, 4b, 4c bears with an annular contact surface against the curved, inner surface 16 of the cover 14 and therefore supports the axial force of the piston rod 7 on the support element 2 via the cover 14 and the securing ring 15.

What is claimed is:

1. A spring-strut support bearing for supporting a motor-vehicle spring strut on a vehicle body, comprising a spring strut shock absorber with a piston rod, a vehicle body support element via which the spring strut shock absorber is supported on the vehicle body, a connecting element mounted on said piston rod for connection to said vehicle body support element, resilient spring elements arranged between the connecting element and the support element and including, a first resilient spring element structure arranged radially between the connecting element and the support element, a second resilient spring element structure mounted on said piston rod and disposed adjacent a section of said support element so as to engage said support element to limit axial movement of said piston rod in one axial direction and a third resilient spring element connected to said piston rod and disposed adjacent a section of said support element so as to engage said support element to limit axial movement of said piston rod in the opposite axial direction, said support element section having an approximately spherical configuration with an opening through which said piston rod extends into said vehicle body support element, wherein the piston rod is connected to said connecting element.

2. A spring-strut support bearing according to claim 1, wherein said resilient spring elements are formed as an integral structural body which is connected to said support body.

3. A spring-strut support bearing according to claim 1, wherein said structure for limiting axial movement of said piston rod includes two stop discs between which at least part of the spherical section of the support element is disposed.

4. A spring-strut support bearing according to claim 3, wherein each stop disc has, on the its side facing the support element, an annular surface area which is of approximately toroidal shape.

5. A spring-strut support bearing according to claim 4, wherein said resilient spring elements are elastic damping elements provided on the surface of each support disc, which faces the supporting element and provide said toroidal shape.

6. A spring-strut support bearing according to claim 5, wherein the elastic damping elements arranged on the stop discs form annular beads.

7. A spring-strut support bearing according to claim 3, wherein the stop discs are arranged annularly around the piston rod and mounted thereon in spaced relationship with the support element being disposed between the two stop discs.

* * * * *